US008230265B2

(12) United States Patent
Rajashekara et al.

(10) Patent No.: US 8,230,265 B2
(45) Date of Patent: Jul. 24, 2012

(54) TESTING SOFTWARE IN ELECTRONIC DEVICES

(75) Inventors: Shashidhar Rajashekara, Sammamish, WA (US); Roshan Khan, Seattle, WA (US); Ke Xue, Woodinville, WA (US); Palani Sundaramurthy, Kirkland, WA (US); G. Eric Engstrom, Kirkland, WA (US); Evan R. Stavrou, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/751,994

(22) Filed: Mar. 31, 2010

(65) Prior Publication Data

US 2011/0246834 A1 Oct. 6, 2011

(51) Int. Cl.
*G06F 11/00* (2006.01)
(52) U.S. Cl. ........................................................ 714/38
(58) Field of Classification Search .................... 714/31, 714/38
See application file for complete search history.

(56) References Cited

U.S. PATENT DOCUMENTS

| 5,612,963 | A | 3/1997 | Koenemann |
| 6,487,713 | B1 | 11/2002 | Cohen |
| 6,631,344 | B1 | 10/2003 | Kapur |
| 6,807,646 | B1 | 10/2004 | Williams |
| 2007/0038898 | A1 * | 2/2007 | Clee et al. ........................ 714/38 |

OTHER PUBLICATIONS

"Automated test suite," Apr. 18, 2008, 1 p., downloaded from http://www.dsp-fpga.com/producs/search/fm/id/?36493.
Bareisa, et al., "Functional Test Generation Based on Combined Random and Deterministic Search Methods," *Informatica*, vol. 18, No. 1, pp. 3-26, 2007.
Chen, et al., "DEFUSE: A Deterministic Functional Self-Test Methodology for Processors," *18th IEEE VLSI Test Symposium*, 8 pp., Apr. 30-May 4, 2000.
"Choosing Between FPGA-Enabled and Drive-Defined High-Speed Digital I/O Devices," Apr. 6, 2009; 3 pp., downloaded from http://zone.ni.com/devzone/cda/tut/p/id/8058.
"Customize Windows in Audit Mode," Oct. 22, 2009, 1 p., downloaded from http://technet.microsoft.com/en-us/library/cc722413(WS.10).aspx.
"Future Directions for the Windows CE Test Kit," 2006, 5 pp., downloaded from http://download.microsoft.com/download/5/b/9/5b97017b-e28a-4bae-ba48-174cf47d23cd/WCE033_WH06.ppt.
Phung, Samual, *Professional Microsoft Windows Embedded CE 6.0*, Ch. 1, "Windows Embedded CE," 14 pp., Nov. 2008.
"Static Analysis Database Tools, Managing Remote Computers, and More," Jul. 2009, 4 pp., downloaded from http://msdn.microsoft.com/en-us/magazine/dvdarchive/dd943051.aspx.
*Windows Mobile Developer Center*, "Hopper Test Tool," Aug. 28, 2008, 1 p., downloaded from http://msdn.microsoft.com/en-us/library/bb158517.aspx.

* cited by examiner

*Primary Examiner* — Amine Riad
(74) *Attorney, Agent, or Firm* — Klarquist Sparkman, LLP

(57) ABSTRACT

Software in an electronic device can be tested using a combination of random testing and deterministic testing. In various embodiments, deterministic tests can run for a prescribed duration and/or a prescribed number of iterations before and/or after random testing. Test results can be weighted using a metric representing an amount of code that was stressed during testing. This metric can be determined by tracking software code that is loaded into memory during testing.

20 Claims, 15 Drawing Sheets

US 8,230,265 B2

TESTING SOFTWARE IN ELECTRONIC DEVICES

FIELD

The disclosed technologies relate to testing software, for example, software for electronic devices.

BACKGROUND

Electronic devices often use software developed by multiple parties. For example, the operating system or drivers may be developed by a first company, while an application may be developed by a second company. The software portions developed by the different companies may have compatibility issues. However, testing devices with software from various sources to identify problems can be difficult. For example, in at least some cases instrumented builds for some or all of the software may be unavailable.

SUMMARY

Software in an electronic device can be tested using a combination of random testing and deterministic testing. In various embodiments, deterministic tests can run for a prescribed duration and/or a prescribed number of iterations before and/or after random testing. Test results can be weighted using a metric representing an amount of code that was stressed during testing. This metric can be determined by tracking software code that is loaded into memory during testing.

Some exemplary embodiments are a computer-implemented method comprising placing software operating on a portable electronic device in a random state by providing random input to the device, and performing one or more deterministic tests on the software on the device from the random state. A metric can be created by measuring a portion of the software operating on the device that is tested by the providing the random input or by the one or more deterministic tests. The method further comprises weighting one or more test results according to the metric. At least a portion of the software operating on the device can comprise a non-instrumented build. The method can further comprise operating one or more monitors of the software while performing at least one of the one or more deterministic tests. The random state can be a first random state, and the method can further comprise placing the software operation on the portable electronic device in a second random state after performing the one or more deterministic tests. The software can comprise a first software portion, and the method can further comprise determining whether the first software portion affects one or more functions of a second software portion. In some cases, the method further comprises storing one or more test results on another electronic device. The method can further comprise interacting with one or more other portable electronic devices as part of the performing the one or more deterministic tests.

In further embodiments, a system comprises: a computer-implemented random test tool configured to place software operating on a portable electronic device in a random state; a computer-implemented deterministic test tool configured to perform one or more deterministic tests on the software from the random state; and a computer-implemented scoring component configured to weight test results based at least in part on how much of the software was tested. The system can further comprise a computer-implemented monitoring component. In some cases, at least one of the random test tool and the deterministic test tool are implemented on the portable electronic device.

In still further embodiments, a method comprises identifying, out of a plurality of software portions in a portable electronic device, one or more software portions that have been loaded, during execution of a test program on the portable electronic device, from a first memory in the portable electronic device into a second memory in the portable electronic device for execution of the identified software portions by the device. The method further comprises generating a description of the identified one or more software portions. In some cases, the identifying comprises monitoring at least one of a page pool and a loader component. The one or more software portions are divided into sections related to the size of a memory page. The method further comprises generating a score for the portable electronic device relative to another portable electronic device. The method further comprises determining an amount of the plurality of software portions tested by the test program based at least in part on the identified software portions. In some cases, at least a portion of the plurality of software portions are non-instrumented.

One or more computer-readable storage media can store instructions which, when executed by a computer, cause the computer to perform any of the methods described herein.

The foregoing and other features of the disclosed technologies will become more apparent from the following detailed description, which proceeds with reference to the accompanying figures.

DETAILED DESCRIPTION

Figure 1:
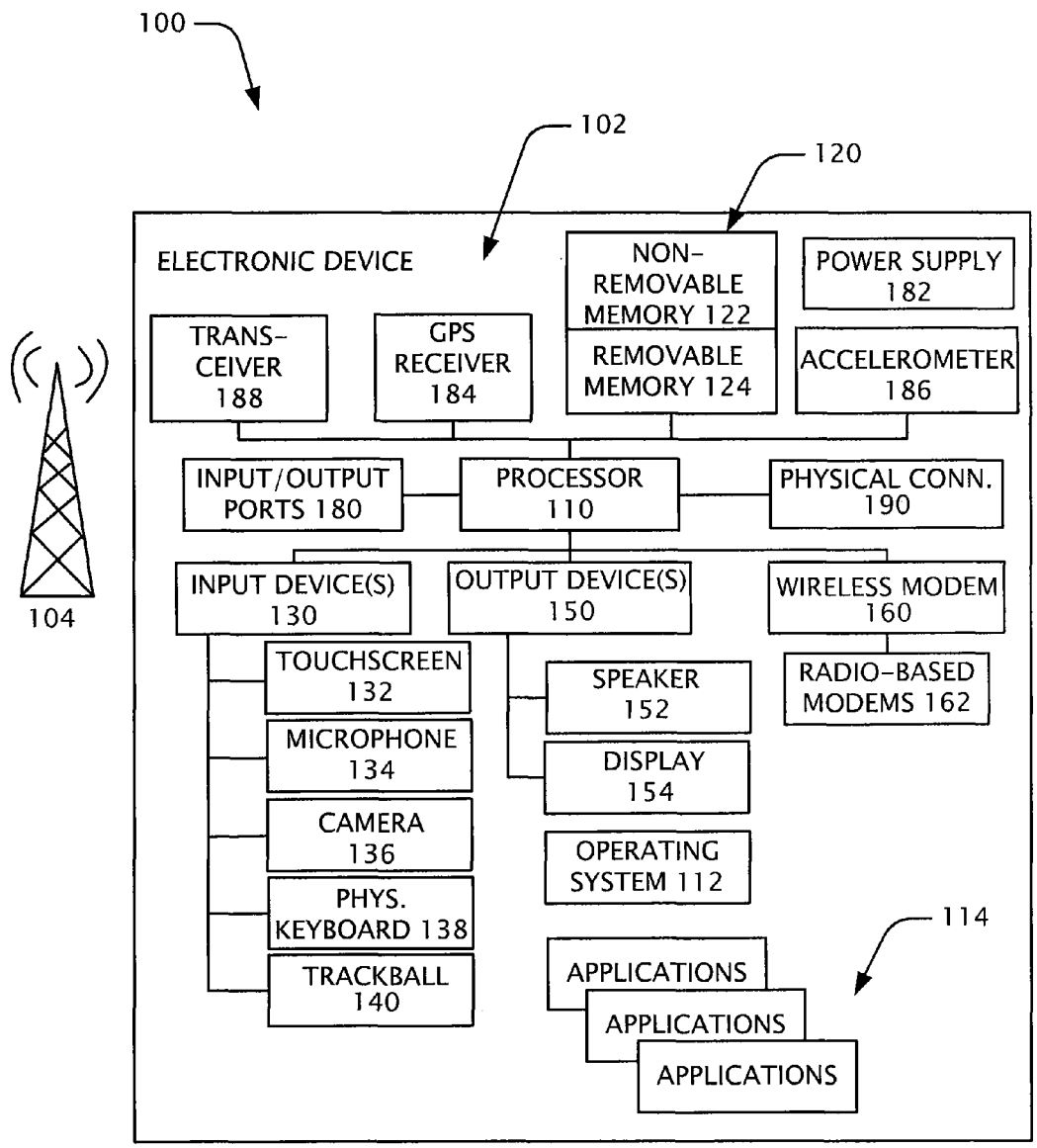
FIG. 1 shows an exemplary electronic device.

Disclosed below are embodiments of testing technologies and/or related systems and methods. The embodiments should not be construed as limiting in any way. Instead, the present disclosure is directed toward all novel and nonobvious features and aspects of the various disclosed methods and systems, and equivalents thereof, alone and in various combinations and subcombinations with one another. The methods disclosed herein are not performed purely in the human mind.

As used in this application and in the claims, the singular forms "a," "an" and "the" include the plural forms unless the context clearly dictates otherwise. Additionally, the term "includes" means "comprises." When used in a sentence, the phrase "and/or" can mean "one or more of" the elements described in the sentence. Embodiments described herein are exemplary embodiments of the disclosed technologies unless clearly stated otherwise.

Although the operations of some of the disclosed methods and systems are described in a particular, sequential order for convenient presentation, it should be understood that this manner of description encompasses rearrangement, unless a particular ordering is required by specific language set forth below. For example, operations described sequentially can in some cases be rearranged or performed concurrently.

For the sake of simplicity, the figures may not show the various ways in which the disclosed methods and systems can be used in conjunction with other methods and systems. Additionally, the description sometimes uses terms like "perform," "capture" and "send" to describe the disclosed technology. These and other terms are high-level abstractions of the actual operations that are performed. The actual operations that correspond to these terms may vary depending on the particular implementation and are readily discernible by one of ordinary skill in the art. As used herein, "random" can include "pseudo-random."

Any of the methods described herein can be performed using software comprising computer-executable instructions stored on one or more computer-readable storage media. Furthermore, any intermediate or final results of the disclosed methods can be stored on one or more computer-readable storage media. Computer-readable storage media can include non-volatile storage such as, for example, read-only memory (ROM), flash memory, hard disk drives, floppy disks and optical disks. Computer-readable storage media can also include volatile storage such as, for example, random-access memory (RAM), device registers and processor registers. Any such software can be executed on a single computer or on a networked computer (networked, for example, via the Internet, a wide-area network, a local-area network, a client-server network, or other such network).

The software embodiments disclosed herein can be described in the general context of computer-executable instructions, such as those included in program modules, which can be executed in a computing environment on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing environment. For clarity, only certain selected aspects of the software-based implementations are described. Other details that are well known in the art are omitted. For example, it should be understood that the disclosed technologies are not limited to any specific computer language, program, or computer. For instance, the disclosed embodiments can be implemented using a wide variety of commercially available computer systems. Any of the disclosed methods can alternatively be implemented (partially or completely) in hardware (e.g., an ASIC, PLD, or SoC). Portions of one or more disclosed methods can be executed by different parts of a distributed computing environment.

Additionally, intermediate or final results (e.g., one or more test results), created or modified using any of the disclosed methods can be stored on one or more tangible computer-readable storage media. In some cases, intermediate or final results (e.g., one or more test results), produced by any of the disclosed methods, can be presented to a user using a suitable device (e.g., a computer monitor). Such presentation and/or storing can be performed as part of a computer implementation of any of the disclosed methods.

Furthermore, any of the software embodiments (comprising, for example, computer-executable instructions for causing a computer to perform any of the disclosed methods) can be transmitted, received, or accessed through a suitable communication means. Similarly, intermediate or final method results, created or modified using any of the disclosed methods, can be transmitted, received, or accessed through a suitable communication means. Such suitable communication means include, for example, the Internet, the World Wide Web, an intranet, cable (including fiber optic cable), magnetic communication means, electromagnetic communication means (including RF, microwave, and infrared communications), electronic communication means, or other such communication means. Such communication means can be, for example, part of a shared or private network.

Various embodiments of one or more electronic devices can be used with at least some of the disclosed technologies, including a television or other display device (possibly acting in conjunction with a digital set-top box (not shown)), a handheld computing device (e.g., a personal digital assistant (PDA), a cell phone, a smartphone, an eBook reader, a video game player, a portable music or video player) and a personal computer (e.g., a desktop computer, a laptop computer, a netbook, a server, a thin client, a video game console). In particular embodiments, two or more of these devices are used in combination with one or more of the disclosed technologies. At least some electronic devices can be configured to receive data from and/or transmit data to a network (e.g., a wireless network, the Internet).

FIG. 1 is an exemplary electronic device 100 including a variety of optional hardware and software components, shown generally at 102. Any of the components 102 in the device 100 can communicate with any other component, although not all connections are shown, for ease of illustration. The device 100 can be any of a variety of devices described herein and can allow wireless two-way communications with one or more mobile communications networks 104, such as a cellular or satellite network. The illustrated device can include a controller or processor 110 (e.g., signal processor, microprocessor, ASIC, or other control and processing logic circuitry) for performing such tasks as signal coding, data processing, input/output processing, power control and/or other functions necessary for implementing the device. An operating system 112 can control the allocation and usage of the components 102 and provide support for one or more application programs 114. The application programs 114 typically include e-mail applications, calendars, contact managers, web browsers, text and media messaging applications. The application programs 114 can also implement embodiments of one or more methods disclosed herein. Memory 120 can include non-removable memory 122 and/or removable memory 124. The non-removable memory 122 can include RAM, ROM, flash memory, a hard disk, or other well-known memory storage technologies and can be used for storing data and/or code for running the operating system 112 and the application programs 114. Example data can include web pages, text, images, sound files, video data, test results, test instructions or other data sets transferable to and from one or more network servers or other devices via one or more wired or wireless networks. The removable memory 124 can include flash memory or a Subscriber Identity Module (SIM) card, which is well known in GSM communication systems, or other well-known memory storage technologies, such as "smart cards." The memory 120 can be used to store a subscriber identifier, such as an International Mobile Subscriber Identity (IMSI) and an equipment identifier, such as an International Mobile Equipment Identifier (IMEI). Such identifiers can be transmitted to a network server to identify users and equipment.

The device 100 can support one or more input devices 130, such as a touch screen 132, microphone 134, camera 136, physical keyboard 138 and/or trackball 140 and one or more output devices 150, such as a speaker 152 and/or a display 154. Other possible output devices (not shown) can include piezoelectric or other haptic output devices. A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems 162 (e.g., Bluetooth or Wi-Fi). The wireless modem 160 is typically configured for communication with one or more cellular networks, such as a GSM network for data and voice communications within a single cellular network, between cellular networks, or between the device and a public switched telephone network (PSSTN). The device can further include at least one input/output port 180, a power supply 182, a satellite navigation system receiver 184 (such as a Global Positioning System (GPS) receiver), an accelerometer 186, a transceiver 188 (for wirelessly transmitting analog or digital signals) and/or a physical connector 190, which can be a USB port, IEEE 1394 (firewall) port, LAN port, and/or RS-232 port. Further embodiments can include a wired modem (not shown). The illustrated components 102 are not required or all-inclusive, as any components can be deleted and other components can be added.

Figure 2:
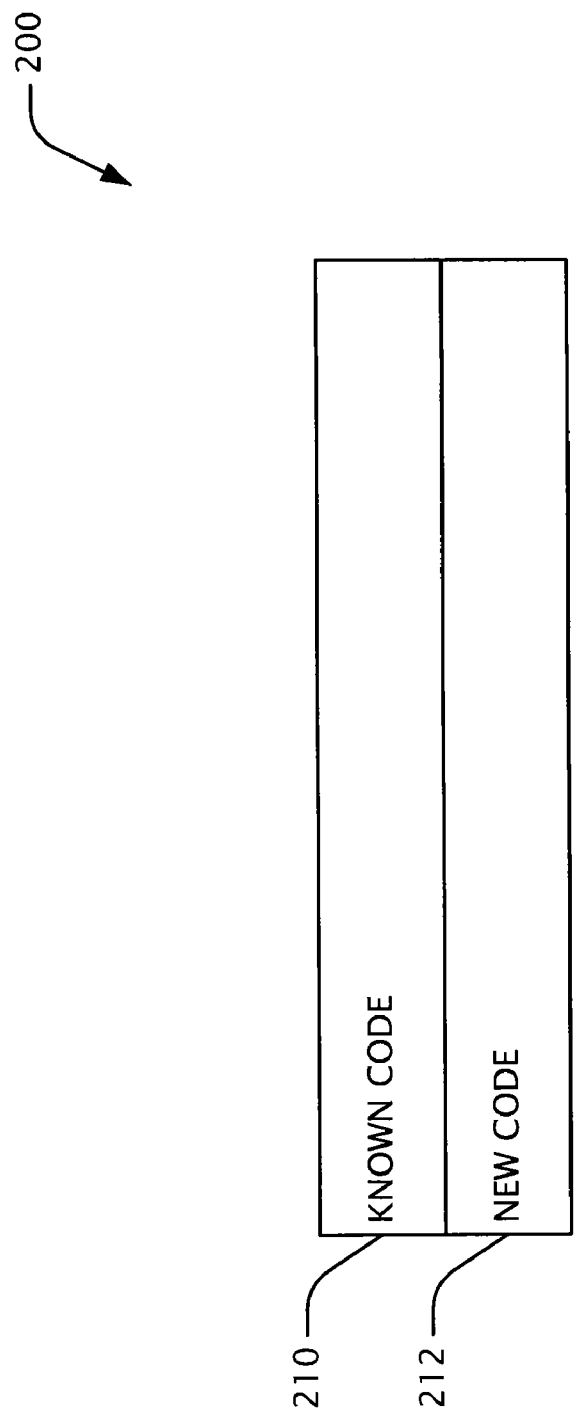
FIG. 2 is a block diagram representing an exemplary embodiment of software on an electronic device.

FIG. 2 is a block diagram representing an exemplary embodiment of software 200 on an electronic device. The software 200 is sometimes called "a ROM image" or a "surface ROM," although the embodiments disclosed herein are not limited to software stored in any particular type of computer-readable medium. The software 200 includes known code 210, which is software whose performance, reliability and/or other qualities are relatively known to a party performing testing of the software 200. This may be because, for example, the known code 210 was developed by the party performing the testing or by a related party, or because information about the known code 210 is otherwise available. In some cases, the known code 210 comprises APIs and/or one or more applications.

The software 200 further comprises new code 212. The new code 212 is "new" in the sense that its performance, reliability and/or other qualities are not as well known as those of the known code 210. The phrase "new" does not necessarily imply a particular age or version of the code 212. In some cases, the new code 212 is not developed by a party performing the testing or by a related party. The new code 212 can comprise, for example: board support package (BSP) code, which can include Original Equipment Manufacturer (OEM) Adaptation Layer (OAL) libraries and drivers, for example; customization code, to customize the software and create differentiating experiences (e.g., a new menu or other user interface element); and other code for one or more additional purposes (e.g., code added on behalf of a mobile operator (MO) in the form of new applications, new navigation paradigms, etc.).

In some cases, the known code 210 is provided by a first developer and the new code 212 is provided by a second developer (e.g., OEMs). For example, the first developer (e.g., a software developer) can provide the operating system for a portable electronic device, including the known code 210. The second developer (including, e.g., other software and/or hardware developers) who creates the device can provide the new code 212. The relative sizes of the known code 210 and the new code 212 can vary. In some cases, the new code 212 makes up 50% or more of the executable code in a device. In further embodiments, the relative proportions of the known code 210 and the new code 212 can be different.

In particular embodiments, the software 200 comprises one or more instrumented builds. In further embodiments, the software 200 comprises one or more non-instrumented builds. For some embodiments, tests are performed on a retail version or similar version of the electronic device and its software.

Generally, being able to test a larger amount of the software 200 on the electronic device can lead to more comprehensive testing results and/or more consistent quality measurement. In some cases, a test suite (e.g., for testing functional, performance and/or stress aspects) may be available for testing some, but not all, of the software 200. For example, the test suite may be available for the known code 210, but not for the new code 212. Generally, more comprehensive software testing can be performed if one or more other parties (e.g., besides the party performing the testing) have the option of developing and/or providing custom tests (e.g., tests for the new code 212). The testing party can be a developer of one or more portions of the software 200 or another party. However, tests that stress little or none of a given portion of the software 200 (e.g., the new code 212) may not provide reliable indicators of device quality. For example, such tests may not identify one or more problems with the new code 212. In certain situations, other parties need incentives to develop and/or provide the custom tests, particularly custom tests that adequately stress the new code 212.

Figure 3:
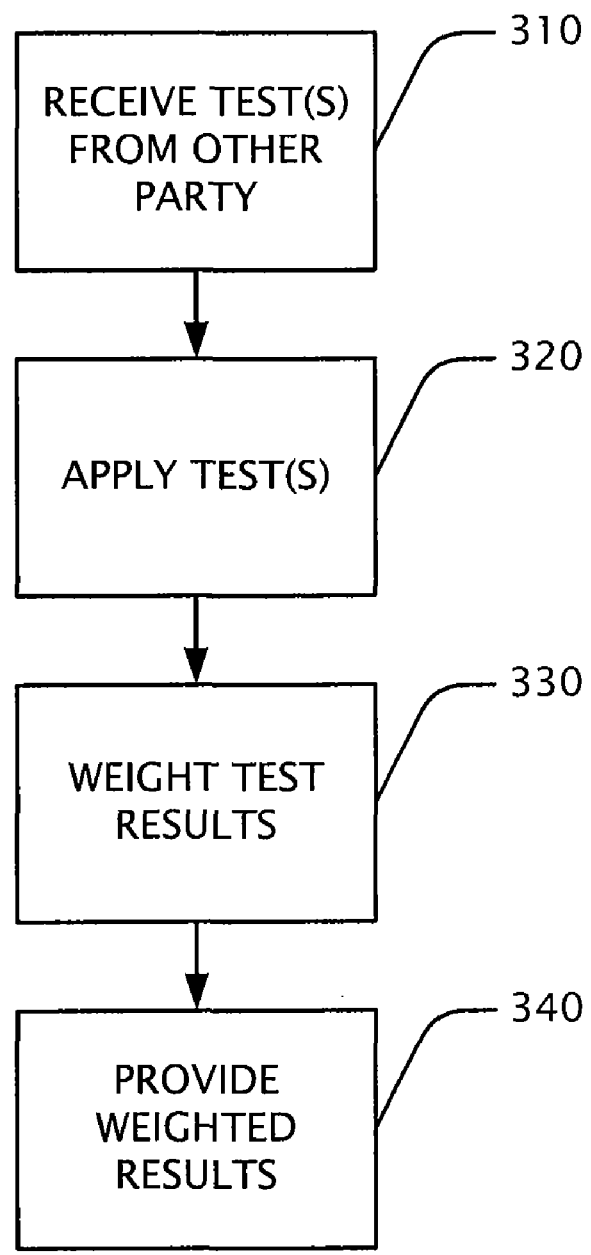
FIG. 3 is a block diagram of an exemplary embodiment of a method for testing electronic devices.

FIG. 3 shows a block diagram of an exemplary embodiment of a method 300 that some embodiments use to address the issue of inadequate tests. In a method act 310, one or more tests are received from one or more other, non-testing parties. The tests are applied by the testing party to the software of a device in a method act 320. In a method act 330, the testing party weights the results (e.g., scales the results) of the performed tests using a metric indicating how much of the software 200 was stressed by the tests. (Exemplary embodiments of technologies for determining such a metric are discussed below.) In some embodiments, these weighted test results provide a quantitative value representing device quality (e.g., in terms of stability, performance, battery and/or one or more other factors). The weighted test results can be provided to the other parties in a method act 340, possibly providing an incentive for the other parties to provide and/or develop effective custom tests, since not providing the custom tests (or providing custom tests that inadequately stress the software 200) results in lower weighted test results.

Tests can often be more effective in measuring device quality when they generally reflect one or more real-world conditions. For example, a telephonic device can be tested while being coupled to a wireless network (e.g., GSM, CDMA), making and/or receiving phone calls, sending and/or receiving e-mails, accounting for varying signal strengths, and/or having access to user data (e.g., contacts, e-mails).

Testing processes can also be more effective when one or more of the following are provided: one or more processes that aid in testing RTM (release-to-manufacturing) code with only device-specific components (e.g., prior to customization and/or adding new components), to help isolate any BSP-related issues; a consistent quality bar for devices among hardware and/or software developers (e.g., based on stability, performance, battery life, mean-time-to-failure (MTTF), code coverage, binary/executable coverage, memory footprint and/or memory corruption); retail devices (or similar devices) that are available for testing before the device is publicly released; feedback during testing; software builds with support for debugging services (e.g., Kernel Independent Transport Layer (KITL)); non-disclosure agreements between relevant parties (e.g., software developers, OEMs, mobile operators); and sufficient quality assurance requirements (e.g., MTTF). However, at least some embodiments of the disclosed technologies can be used even when some of these are unavailable or when none of these is available.

At least some embodiments of the disclosed technologies use deterministic testing (e.g., testing where a given set of inputs produces a corresponding set of outputs). Deterministic testing allows for testing different scenarios in electronic devices (e.g., testing whether the software for a device causes the device to crash (e.g., to stop functioning) and/or to hang (e.g., to stop responding to input), performs per design, and/or is optimized for power consumption). Switching between random testing and deterministic testing can aid in, for example, determining if the new code 212 affects the operation of the known code 210.

Figure 4:
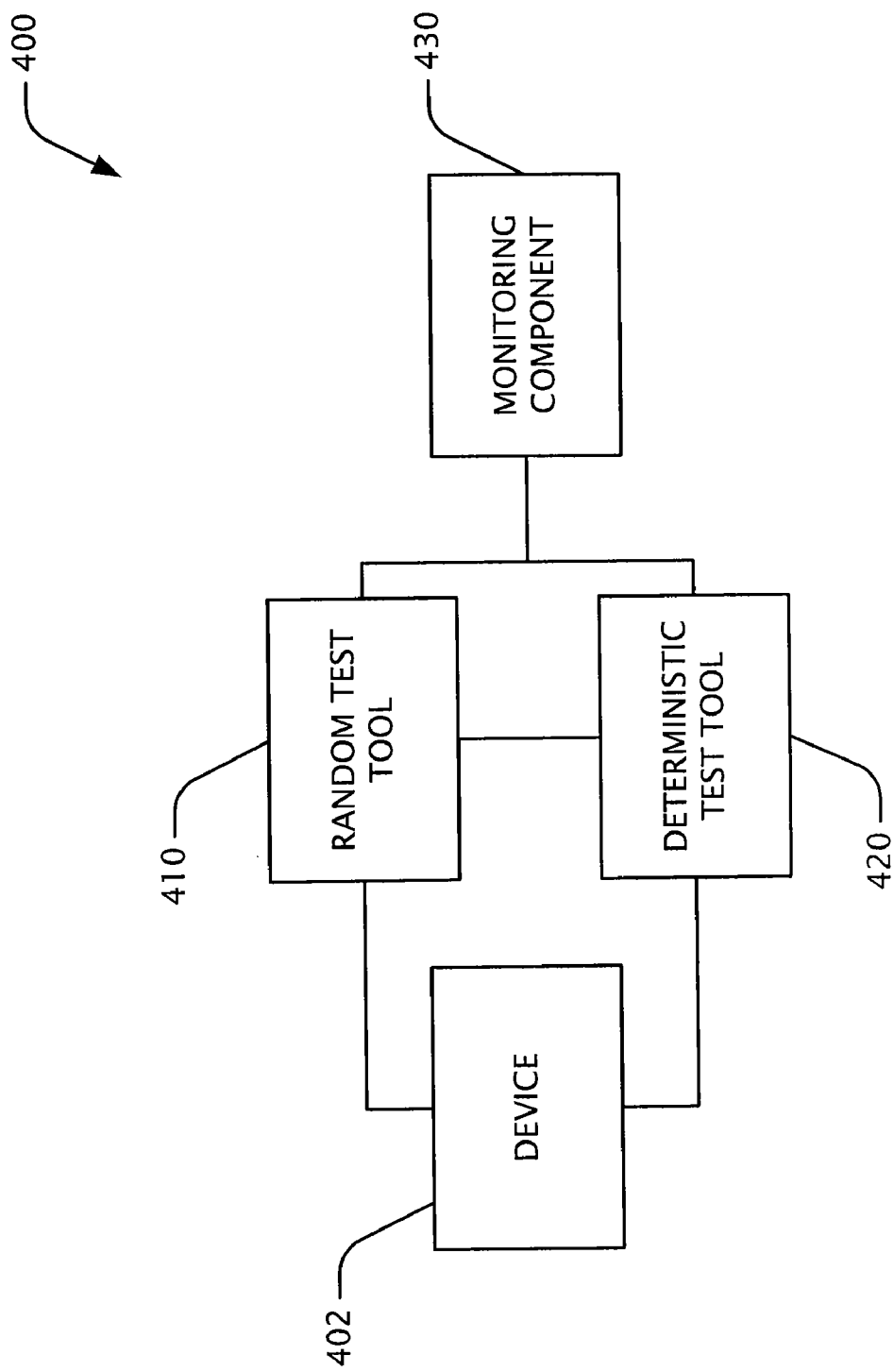
FIG. 4 shows a block diagram of an exemplary embodiment of a system for testing electronic devices.

FIG. 4 shows a block diagram of an exemplary embodiment of a system 400 for testing one or more electronic devices 402 (e.g., portable electronic devices) having software (such as the software 200 described above). The system 400 comprises a random test tool 410 and a deterministic test tool 420. In further embodiments, the system 400 also comprises a monitoring component 430.

Generally, the random test tool 410 is configured to randomly test the device 402 by placing the device in a random state. This can be done by, for example, providing random input to the device (e.g., in the form of random key strokes, mouse input, and/or one or more other forms of input). The tool 410 can also allow for navigating into one or more portions of known code and/or new code in the software. In some embodiments, the random test tool 410 can detect and/or act on particular user interface elements, such as a button or icon. The random test tool 410 can also detect when software hangs and/or crashes. The random test tool 410 can comprise a variation of the Hopper test tool available from Microsoft Corporation. In some cases, the random test tool 410 is configured to simulate real-world random input (e.g., input that might occur when, for example, the device is in a user's pocket).

Generally, the deterministic test tool 420 is configured to test the device using one or more tests (also called "scenarios"). Exemplary scenarios can include: making telephone calls (e.g., using a dialer, using a call history, using a contacts list, using a speaker phone, using a headset); composing, sending and/or receiving SMS messages or other messages (e.g., using a call history, using a contacts list), including during a phone call; composing, sending and/or receiving e-mail (e.g., from an e-mail application such as Microsoft® Outlook®, from a web-based account); navigating through web sites (e.g., top-ten web sites) with or without logging in; downloading, selecting and/or playing media (e.g., music, video, photos) from local storage and/or from a network (e.g., internet, web site); synchronizing data on the device and/or data stored remotely (e.g., calendar data, e-mail data, notes data), possibly using a data synchronization program (e.g., ActiveSync); adding, removing, viewing, editing and/or searching contacts; modifying a display property (e.g., changing between landscape and portrait mode); and testing camera-related functions. A scenario that is considered key to operation of the device is sometimes called a "core scenario." In various embodiments, any of the above scenarios can be "core scenarios."

In some embodiments, the scenarios are selected to determine whether one or more functions of known code are affected by new code.

Figure 5:
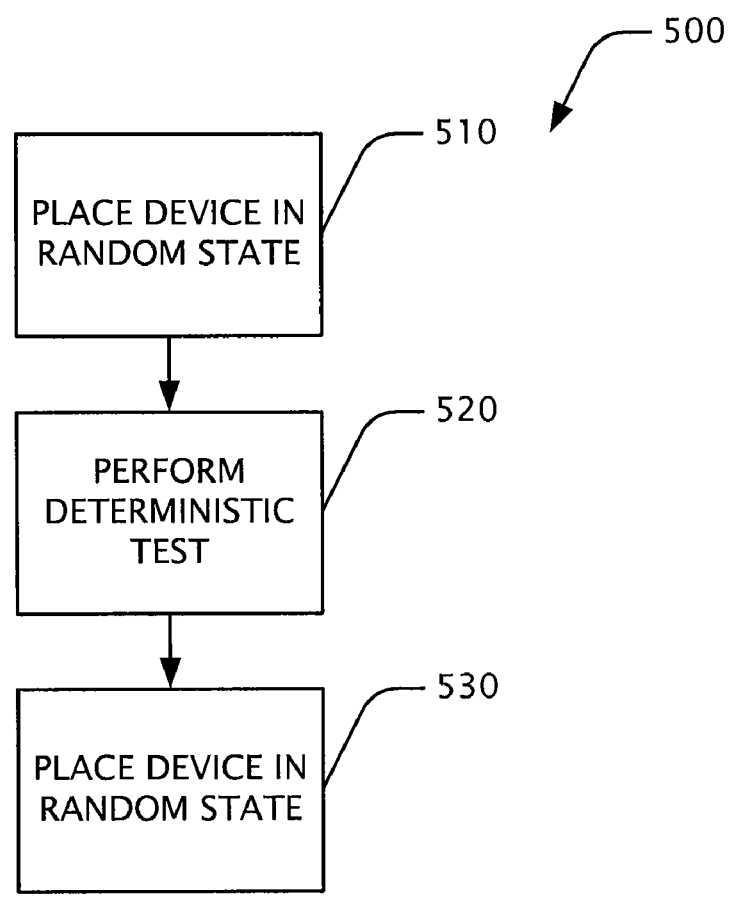
FIG. 5 shows a block diagram of an exemplary embodiment of a method for testing electronic devices.

FIG. 5 shows a block diagram of an exemplary embodiment of a method 500 for testing electronic devices. In a method act 510, an electronic device is placed in a first random state using, for example, the random test tool 410. In a method act 520, one or more deterministic tests are performed on the device using, for example, the deterministic test tool 420. In a method act 530, the device is placed in a second random state using, for example, the random test tool 410. In some embodiments, one of the method acts 510, 530 is omitted. Thus, in some cases, the method act 520 is performed with the device in a random state, while in other cases the method act 520 is performed with the device in a non-random state.

Figure 6:
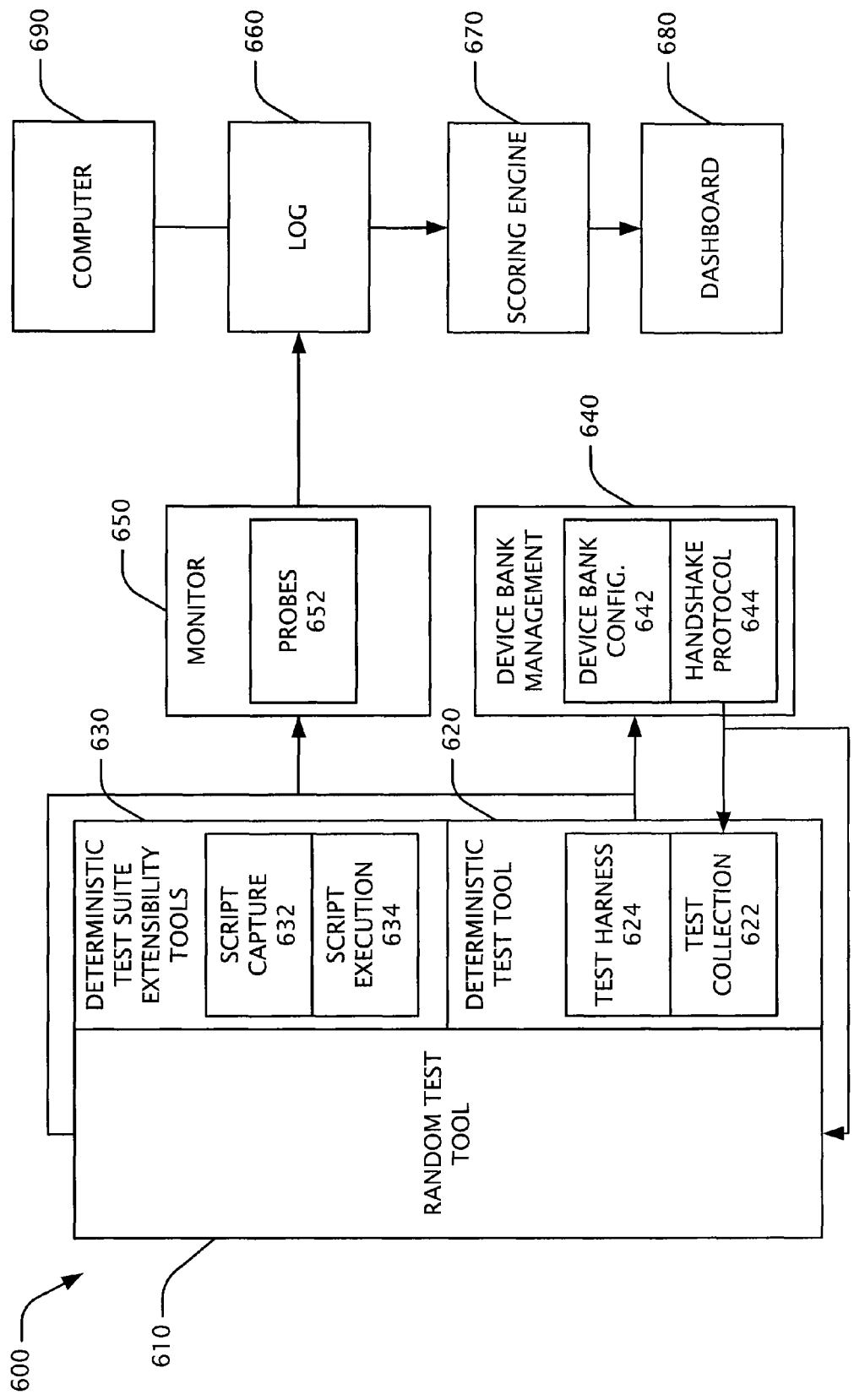
FIG. 6 shows a block diagram of an exemplary embodiment of a system for testing electronic devices.

FIG. 6 shows a block diagram of an exemplary embodiment of a system 600 for testing electronic devices (e.g., portable electronic devices). The system 600 comprises a random test tool 610. In some cases, the random test tool 610 is based on a tool such as Hopper and is integrated with one or more other components in the system 600. For example, the tool 610 can be integrated with a monitor 650 and a deterministic test tool 620, which are described below. The random test tool 610 can provide random input (e.g., random key strokes and/or mouse input) to an electronic device, and the random input can be paused before a deterministic test is run on the device. After the deterministic test is completed, more random input can be provided to the device. When a random test is in progress (e.g., while random input is being provided to the device), a crash and/or hang that occurs can be trapped and logged so that this data can be used for evaluating the device (e.g., for computing a "score," as described below). In some embodiments, one or more probes can be deactivated during a random test. For example, battery and performance data captured during a random test may be less useful, so one or more probes capturing these data can be deactivated during the random test to record test result information. This can reduce log size and make processing the log more efficient. Probes are discussed below in more detail.

The system 600 further comprises a deterministic test tool 620. The deterministic test tool 620 comprises a collection 622 of one or more deterministic tests and a test harness engine 624. The deterministic tests can include one or more of the deterministic tests disclosed herein. Operation of the test harness engine 624 is described in more detail below.

The system 600 also comprises a deterministic test suite extensibility tools component 630. The component 630 can allow for adding one or more additional deterministic tests to the system 600. In some cases, these tests are developed by parties other than a party that is testing the electronic device. For example, the tests can be developed by a party that developed or provided any portion of the software 200 described above. The additional tests can comprise executable-based tests and/or script-based tests. Generally, executable-based tests are relatively robust and require more time and effort to develop. Script-based tests, on the other hand, are less robust but can be developed relatively easily and quickly. The tools component 630 can reduce the cost and time needed to develop deterministic tests.

The component 630 can comprise a script capture component 632 for capturing (e.g., recording) one or more test scripts. When the script capture component 632 is running, a tester can execute a scenario manually while the component 632 captures information on, for example, navigation actions, key strokes and timing. In at least some cases, the component 632 records this information in a "device-agnostic" manner (e.g., the recorded information can be applied to different models of software and/or devices). The tester can modify the recorded information to, for example, define placeholders for variable substitution. (In some cases, variable substitution lowers maintenance by separating a test data set from the actual script.) The component 630 can also comprise a script execution component 634 for playing script-based tests. In some embodiments, the execution component 634 supports variable substitutions in a script prior to script execution.

In some cases, at least one of the components 630, 632, 634 supports markup-language-based scripts (e.g., XML-based scripts).

Some scenarios can be executed using two or more electronic devices. For example, conditions for phone calls, SMS messages (or other messages) and e-mail can be recreated using multiple cells phones or other electronic devices. Some embodiments of the disclosed technologies employ a bank of electronic devices (sometimes the same devices, sometimes different devices) when executing one or more tests. In such cases, the devices are configured to interact with one or more other devices within the bank of devices. One or more of the devices can be configured to execute embodiments of the technologies disclosed herein. Testing multiple devices can improve the sample size for device test data.

To support tests using a bank of electronic devices, the system 600 comprises a device bank management component 640. The component 640 comprises a device bank configurator component 642 and a handshake protocol component 644.

The configurator component 642 allows for configuring one or more electronic devices involved in a test and/or for specifying one or more test parameters. For example, data related to a test can be loaded onto one or more electronic devices using the configurator component 642. Depending on the test, such data can include, for example, contacts, phone numbers, media files (e.g., video and/or audio files), e-mail accounts and/or web site accounts. The component 642 can also be used to specify other test parameters, such as one or more "stop criteria," which identify when a test ends. Stop criteria can include, for example, a time limit and/or a number of iterations for one or more tests in a test suite. In some embodiments, the test harness engine 624 and/or the random test tool 610 are responsible for examining and enforcing one or more stop criteria.

The handshake protocol component 644 coordinates interactions between two or more devices in a bank. This can be useful if, for example, devices switch between different test scenarios. In an exemplary test case, a user types an e-mail message using a device, is interrupted by a phone call on the device (possibly a call with more than one other device), and after the call resumes typing the e-mail. In this case, the device switches from an e-mail scenario to a phone call scenario, and then back to the e-mail scenario. The handshake protocol component 644 coordinates interactions between devices for such cases.

In some embodiments, a bank of eight devices is used to run a stress test. Each device runs the test independently of the other devices, toggling between deterministic and random stress modes over time. A first device can run a random test while a second device runs a deterministic test. If a device is running a deterministic test that requests interaction with another device, the handshake protocol component 644 aids in finding that other device and in synchronizing interaction between the two devices. This helps insure that any device running a deterministic test is not interrupted by such a request (such an interruption may invalidate test results for the interrupted device).

After performing a test involving multiple devices, logs from more than one device can be examined to help evaluate the test results.

The system 600 further comprises a monitor component 650, which includes one or more probes 652. In some embodiments, the monitor component 650 provides a common probe interface (not shown) to control (e.g., start, stop) and configure the probes 652. The interface can be used by, for example, the test harness engine 624, the random test tool 610 and/or one or more other components. In further embodiments, the monitor component 650 provides functions for creating, updating and/or managing one or more probe logs 660.

In some embodiments, the probes 652 comprise a crash probe. The crash probe detects and captures any crash that occurs during testing of a device. The crash probe can create a single log for a test run that has non-verbose and/or filtered data ("optimized" data). Often the crash probe is active through most or all of the testing of a device. In some embodiments, the test harness engine 624 can turn this probe on or off at the beginning or end of a deterministic test. A scenario ID or other information can also be recorded for the probe. This can allow the crash probe and/or another component to correlate a given crash to a scenario and create appropriate entries in a crash log.

In further embodiments, the probes 652 comprise a battery probe. The battery probe measures the power drawn (e.g., from a battery) for a given test scenario and creates one or more logs describing these measurements. The log data can be optimized for use by a scoring engine (described below). In some embodiments, the battery probe takes measurements only when a deterministic test is being performed. This operation is controlled by, for example, the test harness engine 624. The battery probe can comprise hardware such as a power monitor (not shown).

In additional embodiments, the probes 652 comprise a performance probe. The performance probe measures performance of one or more scenarios (e.g.: response time for launching an e-mail inbox; frames-per-second for flicking on a displayed page; amount of memory or storage used; amount of network bandwidth used; or one or more other scenarios). The probe can create one or more logs containing performance data. In some embodiments, the performance probe takes measurements only when a deterministic test is being performed. This operation is controlled by, for example, the test harness engine 624.

In some embodiments, the probes 652 comprise a hang probe. The hang probe detects one or more hangs (e.g., periods when the electronic device become unresponsive to input) that occur during testing and creates one or more logs describing the hang or hangs. Typically, the hang probe is active during most or all of the testing. The test harness engine 624 can order the hang probe to start or stop (e.g., near or at the beginning and/or end of a deterministic test). The hang probe can associate a scenario ID with information describing one or more hangs. In some cases, the scenario ID is provided to the probe by the test harness engine 624.

In still more embodiments, the probes 652 comprise a coverage probe. The coverage probe measures how much code in an electronic device was executed during testing. The coverage probe can create a coverage log for use by a scoring engine. Typically, the coverage probe runs during most or all of the testing activity. Data collection by the coverage probe is generally independent of the scenarios that are executed. Exemplary embodiments of the coverage probe are described in more detail below.

The system 600 further comprises a scoring engine 670. The scoring engine 670 processes one or more of the logs 660 and generates scoring data. The scoring data can, for example, use one or more mathematical and/or logical operations to generate analytical and/or quantitative measures ("scores"). Generally, these scores provide an indicator of relative quality for one or more tested electronic devices. Depending on the embodiment, a higher score or a lower score can indicate better device quality. One or more algorithms used by the scoring engine 670 can account for one or more factors, including, for example: crash, hang, performance and battery results obtained during one or more scenarios (e.g., core scenarios and/or non-core scenarios); crashes and hangs that occur during random testing; whether testing completed according to the stop criteria or instead aborted; whether OEM customization caused at least one deterministic test (e.g., a deterministic test for a core scenario) to fail; and a penalty assigned for having one or more new applications in the software without having one or more corresponding new deterministic tests. In some cases, scoring data further comprises OEM information, mobile operator information, device information, OS build information, ROM version information and/or other information.

At least some embodiments of the scoring engine 670 can be used with various combinations of test systems disclosed herein, including any custom or standard sub-tests. A "total" score for a device and/or one or more sub-scores can indicate the overall performance for a device and where improvements may be needed. Exemplary embodiments of the scoring engine 670 can include one or more of the following features: the engine 670 is reproducible and deterministic; the engine 670 accounts for stability, performance and battery indicators (e.g., across a given set of scenarios); the engine 670 accounts for stability issues (e.g., crashes and hangs) that occur during random testing; the engine 670 accounts for how much of a device's software is tested ("surface coverage"), generally awarding a better score for higher coverage; the engine 670 accounts for a successful completion rate of test scenarios; the engine 670 is extensible to account for new scenarios and tests; the engine 670 can weight different components of a test (e.g., on sub-score and total-score levels); the engine 670 can assign a score or "grade" (e.g., pass/fail) for a given test; the engine 670 can summarize test results using a test case categorization; and the engine 670 can record a given device's name, a software build number, a test date, score information, and any modifiers (exemplary modifiers are discussed below).

Figure 7:
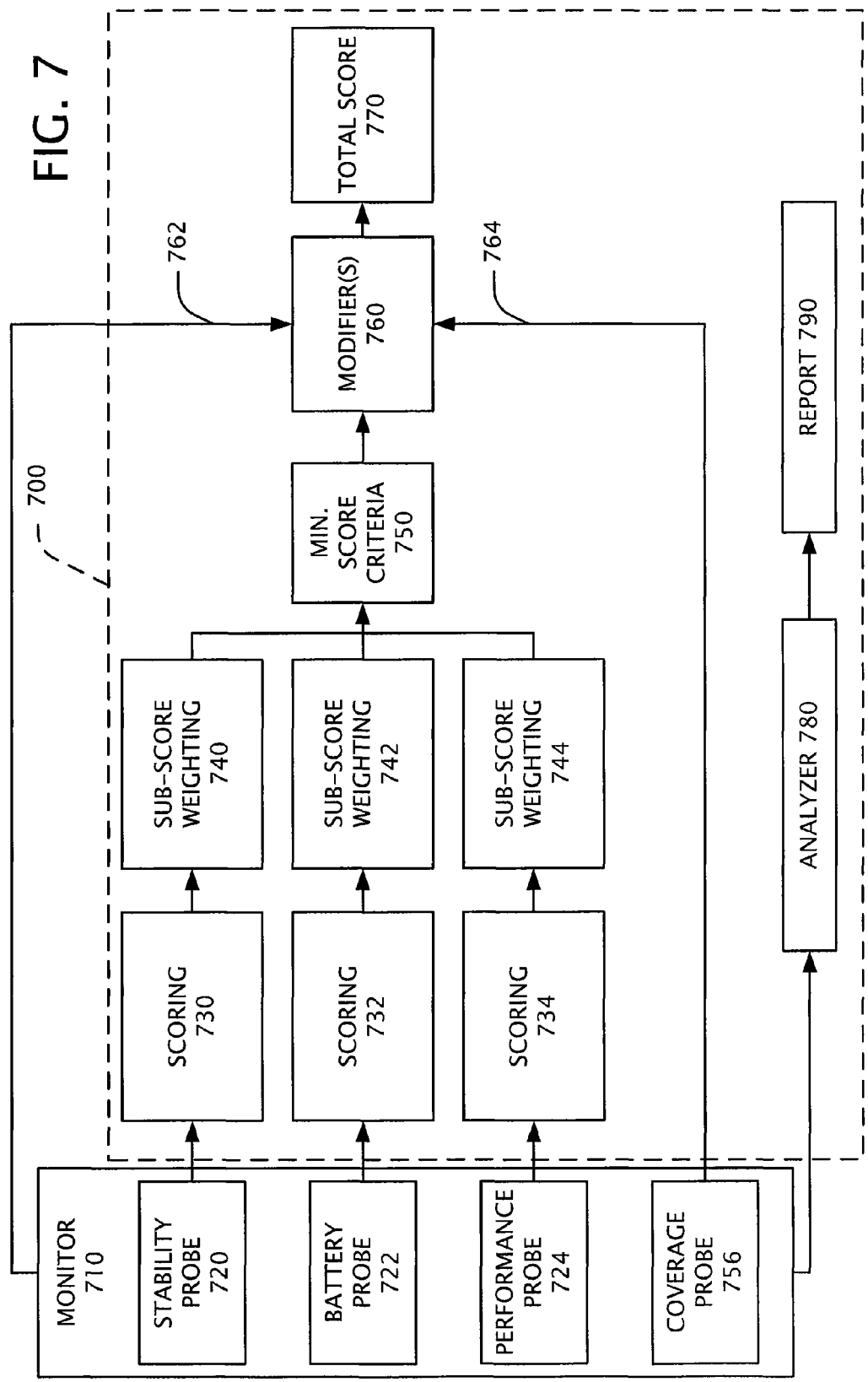
FIG. 7 shows a block diagram of an exemplary embodiment of a scoring engine for use with one or more technologies described herein.

FIG. 7 shows a block diagram of an exemplary embodiment of a scoring engine 700 for use with one or more disclosed technologies. The scoring engine 700 is configured to receive one or more inputs from a monitor 710, which can be similar to the monitor 650, described above. The monitor 710 comprises one or more probes, for example, a stability probe 720, a battery probe 722, a performance probe 724, and a coverage probe 726.

The engine 700 comprises one or more scoring components 730, 732, 734, which receive test results from one or more of the probes 720, 722, 724. In some embodiments, each of the scoring components 730, 732, 734 receives test result data from a corresponding probe 720, 722, 724. In some embodiments, a given scoring component receives test results associated with one or more particular areas. For example, in the depicted embodiment, the scoring component 730 receives test results related to stability, the scoring component 732 receives test results related to battery performance, and the scoring component 734 receives test results related to other performance areas. The scoring components 730, 732, 734 can weight individual test results by one or more weight factors. A given scoring component can be configured to weight different test results differently or to weight all test results equally.

In some embodiments, a test case has an associated reference level (or "baseline") and an indication of the relationship between the test score and the results (e.g., whether a higher or lower score indicates better performance). The score for the test is calculated as a ratio of the actual results to the baseline, multiplied by a scaling value X. In at least some of the embodiments described herein, X=60. Further embodiments use other values.

A stability test score can be calculated using, for example, an equation like the one below:

$$\text{Stability Test Score} = X \times \frac{\text{Stability test result (running time in hours)}}{\text{Baseline (running time in hours)}}$$

The stability test score can reflect, for example, the amount of continuous, crash-free run time that occurs during random and/or scenario-based test runs.

A hang test score can be calculated using, for example, an equation like the one below:

$$\text{Hang Test Score} = X \times \frac{\text{Baseline Hang Frequency} \left(\frac{\text{hangs}}{\text{hour}}\right)}{\text{Hang test result} \left(\frac{\text{hangs}}{\text{hour}}\right)}$$

The hang test score can reflect, for example, the number of hangs detected during random and/or scenario-based test runs.

A battery test score can be calculated using, for example, an equation like the one below (where in this embodiment "DoU" means "Days of Use"):

$$\text{Battery Test Score} = X \times \frac{\text{Current Consumption from Test } (DoU)}{\text{Baseline Current Consumption } (DoU)}$$

The battery test score can reflect, for example, device power consumption measured during the execution of a scenario test run.

A performance test score can be calculated using, for example, an equation like the one below:

$$\text{Performance Test Score} = X \times \frac{\text{Baseline performance marker (ms)}}{\text{Performance (ms)}}$$

The performance test score can reflect, for example, the execution time for a given scenario test run.

Of course, various embodiments of the disclosed technologies can use one or more other equations for calculating test scores.

Each of the scoring components 730, 732, 734 produces a sub-score. For example, a stability sub-score is a weighted average of various stability test scores and various hang test scores. As another example, a battery sub-score is a weighted average of various battery test scores. As a further example, a performance sub-score is a weighted average of various performance test scores.

In some embodiments, the sub-score is passed to a respective sub-score weighting component 740, 742, 744, where the sub-score itself is weighted (e.g., according to the importance that a particular test area is considered to have).

In further embodiments, one or more sub-scores (weighted or otherwise) are compared by a minimum score criteria component 750 to a minimum acceptable score (a "par"). If all of the sub-scores meet or exceed the par, then the component 750 calculates a final score as a weighted average of the sub-scores. The final score can also be adjusted based on one or more modifiers (discussed below). In some cases, where a higher sub-score is better, a score of 60 is set as par. A sub-score less than par generally indicates that problems may exist with a device and/or its software. A maximum score may exist, depending on a given test. If one or more sub-scores is below par, the final score is the lowest sub-score adjusted by one or more modifiers at a modifier component 760. Of course, other scoring arrangements can be used.

Generally speaking, a modifier is used to adjust a score according to a given aspect of test performance. For example, a scenario passage rate modifier reflects a percentage of successfully executed test scenarios. The equation below shows an exemplary calculation for determining the scenario passage rate modifier.

$$\text{Scenario Passage Rate Modifier} = \frac{\text{\# of test scenarios passsed successfully}}{\text{\# of test scenarios in the test suite}}$$

The number of successful scenarios is provided to the modifier component 760 by the monitor 710, as indicated by the arrow 762.

Another example of a modifier is the test execution coverage modifier. "Execution coverage" generally reflects how much of the software in a device was exercised by a given set of tests. The equation below shows an exemplary calculation for determining a test execution coverage modifier.

$$\text{Test Execution Coverage Modifier} = 1.5 \sqrt{\frac{\text{Actual Execution Coverage}}{\text{Target Coverage}}}$$

The actual execution coverage is returned to the modifier component 760 by a coverage probe 756 in the monitor 710. Target coverage (e.g., the desired amount of software to be exercised) can be varied by the tester (e.g., 40%, 50%, 60%, 70%, 80%, 90%, 100%, or some other value).

In some cases, the test execution coverage modifier can be used to incentivize the development and use of additional tests. For example, an OEM or mobile operator may desire to develop and use tests that exercise additional portions of software in a device (e.g., portions that the OEM or MO developed). These additional tests could contribute to a higher rate of actual execution coverage, since they could test previously untested portions of the software. The higher actual execution coverage would produce a higher test execution coverage modifier and higher total test scores 770. Higher test scores can reflect better on the OEM or MO.

Tables 1-4 below show values from an exemplary group of tests and their related, representative score calculations. Table 1 shows the stability, battery and performance sub-scores, along with their respective weights. (Since the performance sub-score is weighted at 0, this sub-score is disregarded when calculating the base score.) The base score is the weighted average of the sub-scores.

Table 2 shows the four tests on which the stability sub-score is based, along with baseline, mean result, and weight information for each test. Tables 3 and 4 show similar information for the battery and performance sub-scores, respectively.

TABLE 1

| | Score | Weight | Base Score 90.68 |
|---|---|---|---|
| Stability Sub Score | 67.9875 | 1 | 67.9875 |
| Battery Sub Score | 113.3748 | 1 | 113.3748 |
| Perf. Sub Score | 60 | 0 | 0 |

TABLE 2

Stability

| | | | | Stability Sub Score 67.99 |
|---|---|---|---|---|
| Test | Baseline (hr) | Mean Results | weight | test score |
| Hopper (test1) | 20 | 23.44 | 1 | 70.32 |
| Hopper RX (test2) | 20 | 20.15 | 1 | 60.45 |
| HS Hopper Calling (test 3) | 20 | 23.31 | 1 | 69.93 |
| LS Hopper Calling (test 4) | 20 | 23.75 | 1 | 71.25 |

TABLE 3

Battery

| | | | | Battery Sub Score 113.37 |
|---|---|---|---|---|
| | Baseline (hr) | Mean Results | weight | Test score |
| Idle | 150 | 524.31 | 1 | 209.724 |
| Audio | 12 | 14 | 1 | 70 |
| Video | 8 | 10.17 | 1 | 76.275 |
| Calling | 4 | 6.5 | 1 | 97.5 |

TABLE 4

Performance

|  | Baseline (ms) | Mean Results (ms) | Performance Sub Score weight | Score 60 Test score |
|---|---|---|---|---|
| Test 1 | 50 | 50 | 1 | 60 |
| Test 2 | 50 | 50 | 1 | 60 |
| Test 3 | 50 | 50 | 1 | 60 |
| Test 4 | 50 | 50 | 1 | 60 |

The base score can be used to calculate a total score. Below is an example equation for calculating a total score:

Total Score=Base Score×Execution Coverage Modifier×Scenario Passage Rate Modifier For the example of Tables 1-4 above, if a target of 60% execution coverage is met (i.e., the actual execution coverage is also 60%) and 75% of the scenarios pass, then Total Score=90.68×1×0.75=68.01

Returning to FIG. 7, the engine 700 can further comprise one or more analyzer components 780 which are configured to produce one or more reports 790 based at least in part on test data provided by the monitor 710. Exemplary reports include a MO pre-certification report containing one or more of the following: a total number of MO pre-certification test cases; a total number of MO pre-certification test cases that were executed; a total number of MO pre-certification test cases that were completed successfully; and details for individual pre-certification test cases. Generally, an MO pre-certification test case is run at the request of the MO before a device enters a certification test phase.

Other exemplary reports can relate to hardware and/or software certification. A report related to the Windows® Logo Test Kit (LTK) can include, for example: a total number of LTK test cases that were executed; a total number of LTK test cases that were completed successfully; and details for individual LTK test cases that were executed.

Figure 8:
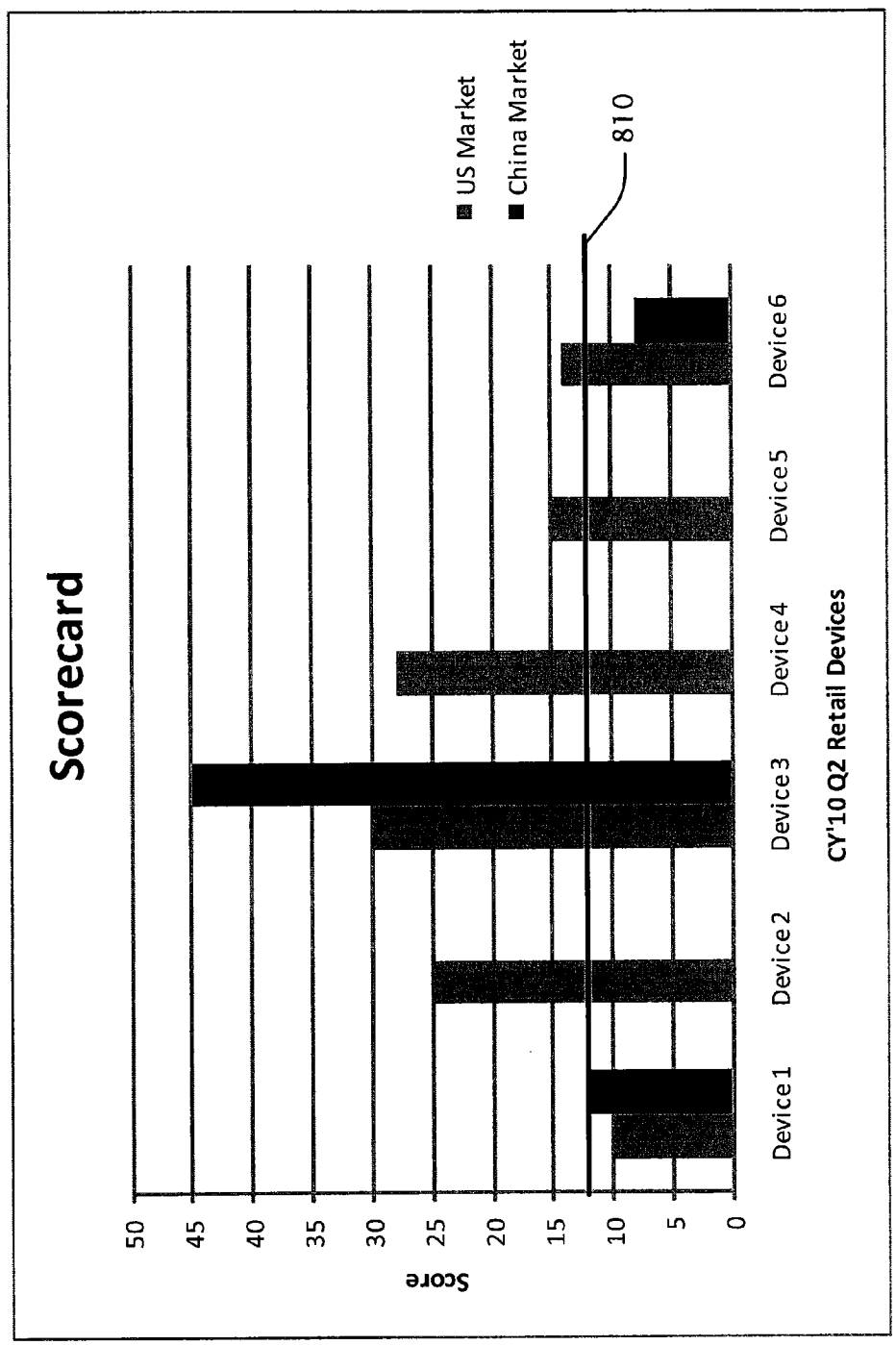
FIGS. 8 and 9 show exemplary embodiments of scorecards for electronic devices.
Figure 9:
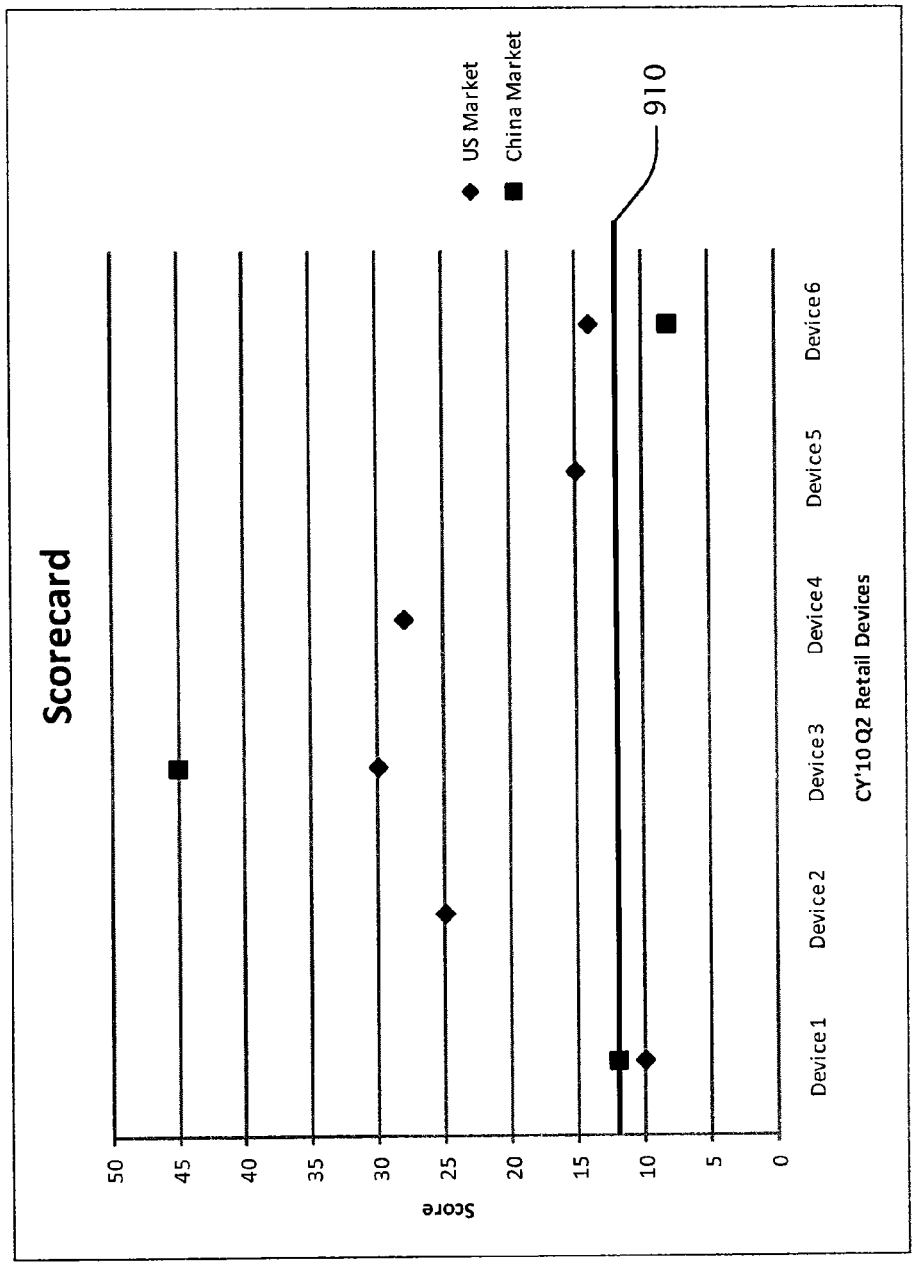

Returning to FIG. 6, scoring data generated by the scoring engine 670 can be provided to a dashboard component 680. The dashboard component 680 presents one or more aspects of the scoring information in a user-readable format to provide an evaluation of device quality. FIGS. 8 and 9 show exemplary embodiments of "scorecards" generated by the dashboard component 680 using scoring data from the scoring engine 670. FIGS. 8 and 9 show total scores for a number of different handheld computing devices, the respective total scores being based on tests executed on the devices. The bars 810, 910 in these figures represent minimum scores that the devices must have (e.g., to qualify for shipping as retail products). FIGS. 8 and 9 also compare results for products created for different markets (e.g., US and China), reflecting differences in localized software versions and operator networks.

Returning briefly to FIG. 6, in some embodiments, the system 600 is run in a "scoring" mode. In scoring mode, most or all of the system 600 runs on the electronic device being tested. The system 600 generates a score (e.g., using the scoring engine 670) reflective of one or more quality and/or performance indicators. In some cases, the system 600 will not stop on a crash or a hang in scoring mode.

In further embodiments, the system 600 is run on a "diagnostic" mode. In diagnostic mode, the system is coupled to one or more other electronic devices, such as a computer 690. The computer 690 provides support for one or more additional components, such as a debugger and/or verbose probe log storage. In diagnostic mode, the system 600 can be configured to stop on a crash and/or a hang. Generally, scoring is not available in the diagnostic mode.

Figure 10:
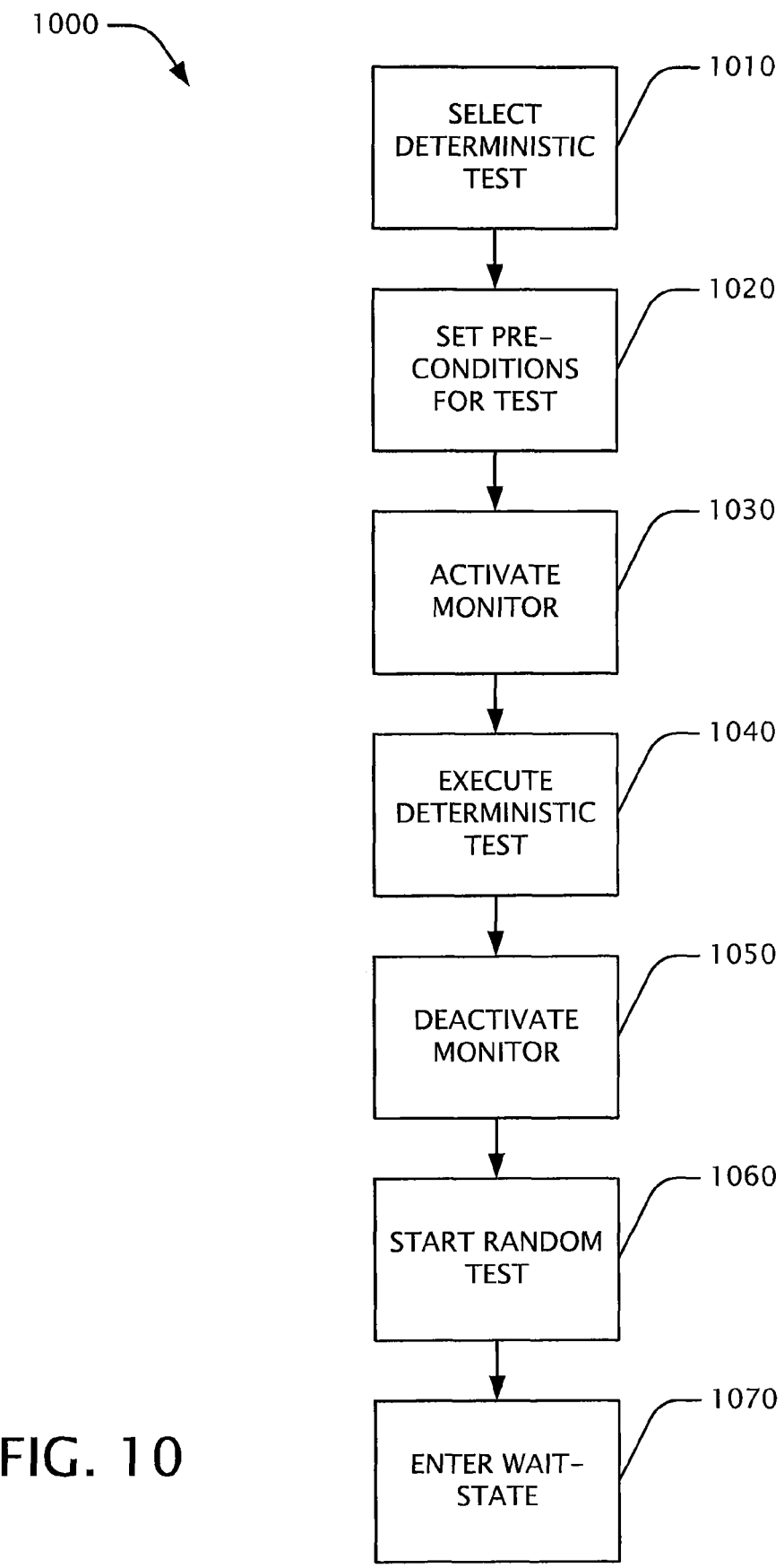
FIG. 10 shows a flowchart of an exemplary embodiment of a method for operating a test harness engine.

FIG. 10 shows a flowchart of an exemplary embodiment of a method 1000 for operating the test harness engine 624. The engine 624 is typically in a wait-state until control is transferred to it from the random test tool 610. Upon receiving control, a method like the method 1000 is performed. In a method act 1010, a test is selected from a collection of deterministic tests. In a method act 1020, any "pre-conditions" for the test are set. For example, for a deterministic test involving a smartphone, the random test tool 610 could have turned off the radio or have the phone in off-hook state, but the deterministic test may require, as a pre-condition, the radio to be on and the phone in an on-hook state. Such conditions could be addressed in the method act 1020. In a method act 1030, the monitor 650 is activated and provided with a scenario ID. One or more probes 652 are activated. In a method act 1040, the deterministic test is executed. In some cases the test is in the form of an executable (e.g., in the form of a DLL with a known entry point), while in other cases the test is in the form of a script. In some embodiments, the test harness engine 624 can directly run or invoke an executable-based test, while the script execution component 634 will be needed to run a script-based test (e.g., with any appropriate parameters). In a method act 1050, a "complete" signal is sent to the monitor 650 upon completion of the deterministic test. This signal can, for example, cause one or more of the probes 652 to stop recording. In a method act 1060, a random test is started using the random test tool 610. In some embodiments, in a method act 1070, the test harness engine 624 enters a wait-state for at least part of the time that the random test of the method act 1060 is performed.

In at least some cases, the test harness engine 624 handles one or more parameters related to testing activities. Such parameters can include, for example, how often to execute one or more tests in a collection of deterministic tests during a run of testing.

For some embodiments, the effectiveness of testing can be improved and/or measured by determining how much software code in an electronic device was "stressed" (e.g., subject to testing) during a given test. Generally, a test score is considered more relevant if the test involved a larger portion of the software code on the electronic device. An execution coverage metric, which can convey how much code was stressed in a test, can be used to reflect this relevancy by weighting test results. In some embodiments, two different electronic devices can be compared using weighted test scores for each device. In various embodiments, execution coverage is used for random testing and/or deterministic testing.

Figure 11:
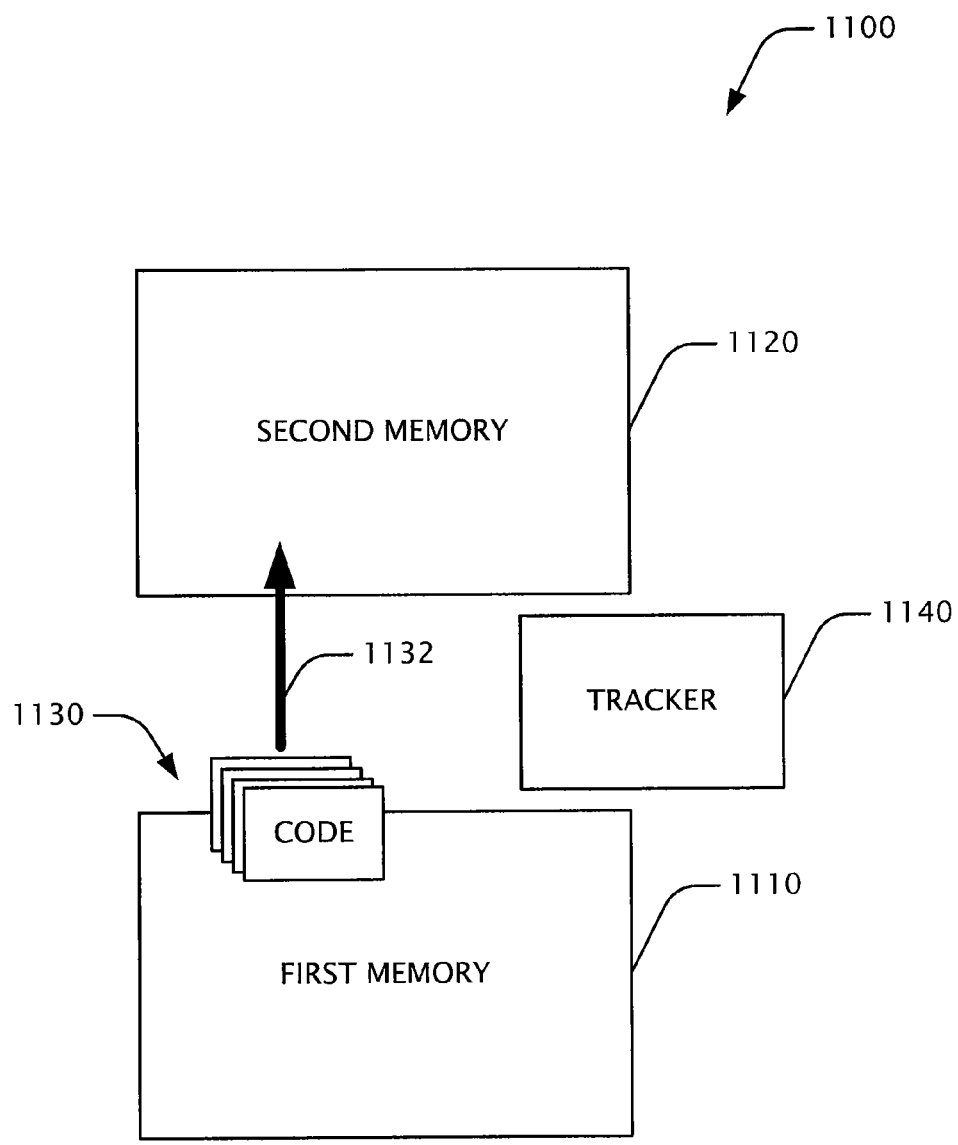
FIG. 11 shows a block diagram of an exemplary configuration for determining execution coverage of software in an electronic device during testing.

FIG. 11 shows a block diagram of an exemplary system 1100 for determining execution coverage of software in an electronic device during testing (e.g., for determining how much of the software was tested by the testing). A first memory 1110 in the electronic device stores software comprising one or more portions of binary code 1130. Generally, the first memory 1110 comprises any computer-readable memory (including virtual memory). In some embodiments, the first memory 1110 further comprises a computer-writable memory (including virtual memory).

While running a test for the software, one or more portions of the binary code 1130 are copied to a second memory 1120 (as indicated by the arrow 1132), where they can be stored for execution. Generally, the second memory 1120 comprises any computer-writable and -readable memory.

A tracker component 1140 monitors the portions of the binary code 1130 that are copied into the second memory 1120 during the test. Generally, if a given portion of the binary code 1130 was loaded into the second memory 1120 during a test, that means that the code portion was stressed during the test. Thus, data recorded by the tracker component 1140 provides at least some indication of how much of the binary code 1130 was stressed during a given test.

Figure 12:
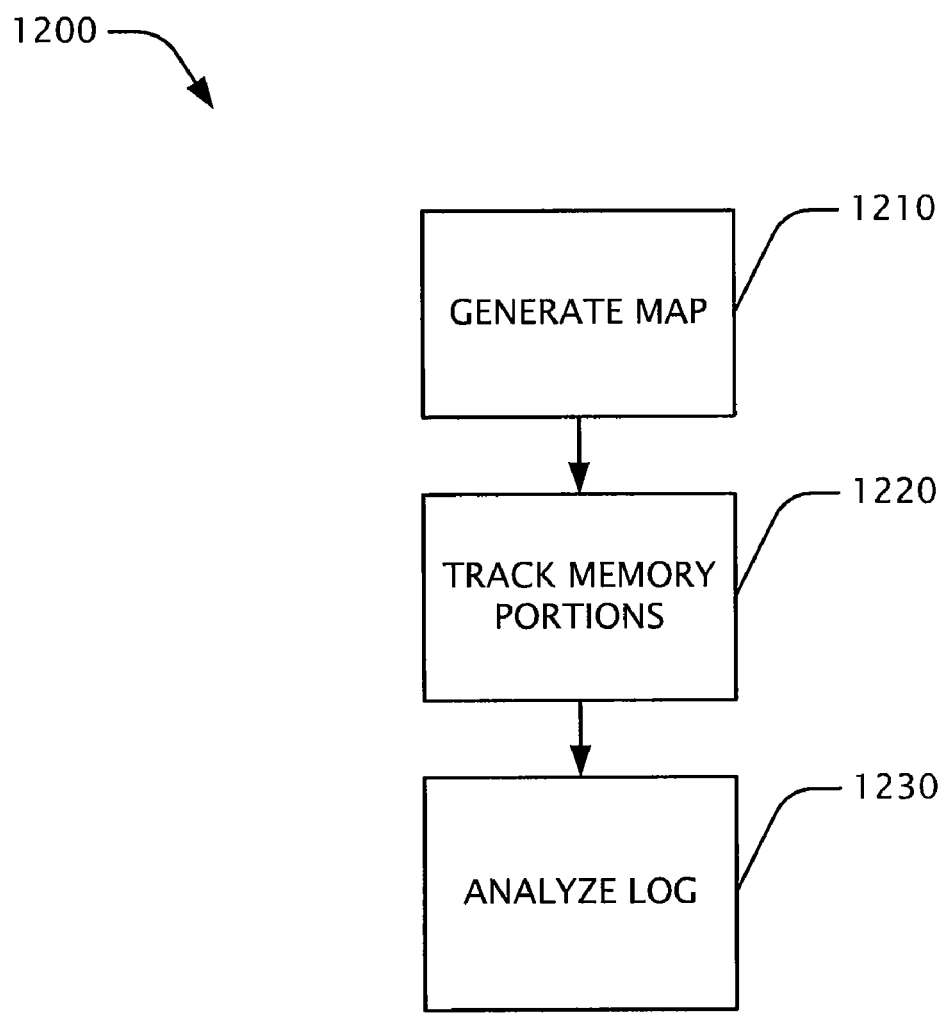
FIG. 12 shows a block diagram of an exemplary embodiment of a method for determining execution coverage of software in an electronic device during testing.

FIG. 12 shows a block diagram of an exemplary embodiment of a method 1200 for determining execution coverage of software in an electronic device during testing. In a method act 1210, a description of the software to be tested is created. The description provides a listing of portions of the software. In at least some embodiments, this description is called a "memory map" of the software. In particular embodiments, the description is called a "DLL (dynamic link library) virtual address map." The map can be created by, for example, examining the software to be tested (e.g., the ROM image) and creating a list of code binaries in the software and of the associated virtual memory addresses of their contents. An entry appears in the map for each binary. The size of the entry can correspond to the physical size (e.g., the amount of data) of the corresponding binary. In some embodiments, the map entries are divided into segments. The segment size or sizes can be based on the size of a memory page (e.g., 4 KB in some systems, one or more other sizes in other systems).

Figure 13:
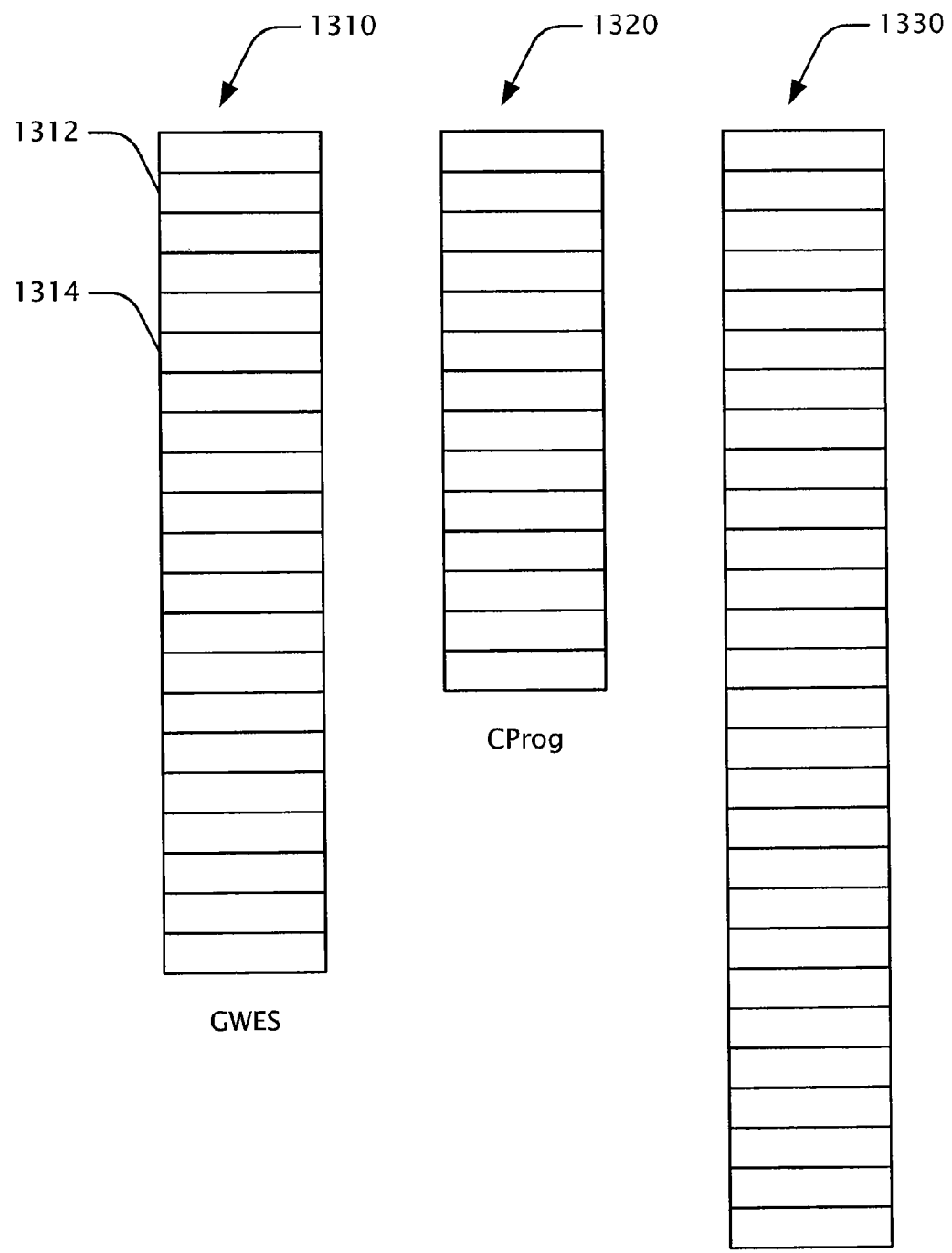
FIG. 13 shows an exemplary embodiment of a listing or map for software in an exemplary electronic device.

FIG. 13 shows an exemplary embodiment of a visual depiction of a listing or map for software in an electronic device. In this case, the software described by the map comprises three binaries: GWES, CProg and DII. These binaries are represented by segments 1310, 1320, 1330, respectively. Each of the segments is divided into sections (e.g., sections 1312, 1314) representing 4 KB of data in the respective binary. Further embodiments use one or more other formats for such maps.

Returning to FIG. 12, in a method act 1220, at least some of the software portions represented in a map are tracked in a log as they are "loaded" by the electronic device. In some embodiments, a software portion is "loaded" when it is placed into physical memory (e.g., RAM) and either executed or read by software performing the testing. In particular embodiments, when a DLL is loaded into physical memory at a specified location, this location is recorded in a log. This log can be implemented by shimming a loader component to monitor status (e.g., modifying the loader component to report which software portions are loaded into physical memory). The page pool also logs pages that the page pool loads. In further embodiments, an OS with a page pool component can also log pages that are loaded.

In a method act 1230, the log of the tracked memory portions is analyzed. For example, memory portions that during testing were "loaded" and became "dirty" can be identified by correlating addresses logged by the loader to physical addresses logged by the page pool (e.g., for pages loaded by the page pool). The dirty regions of the binaries represent portions of code that were loaded into the device's physical memory during testing. This can provide a direct correlation with how much of the code in the device was stressed during testing.

A test system, such as some embodiments of the systems 400, 600, uses data from maps like that of FIG. 13 as a weight in producing a test score. For example, a test run that has a high volume of loaded DLLs, with a high percentage of code execution in a map, will receive a higher score than a test run involving a low volume of DLLs and/or a small, dirty section in the map.

Figure 14:
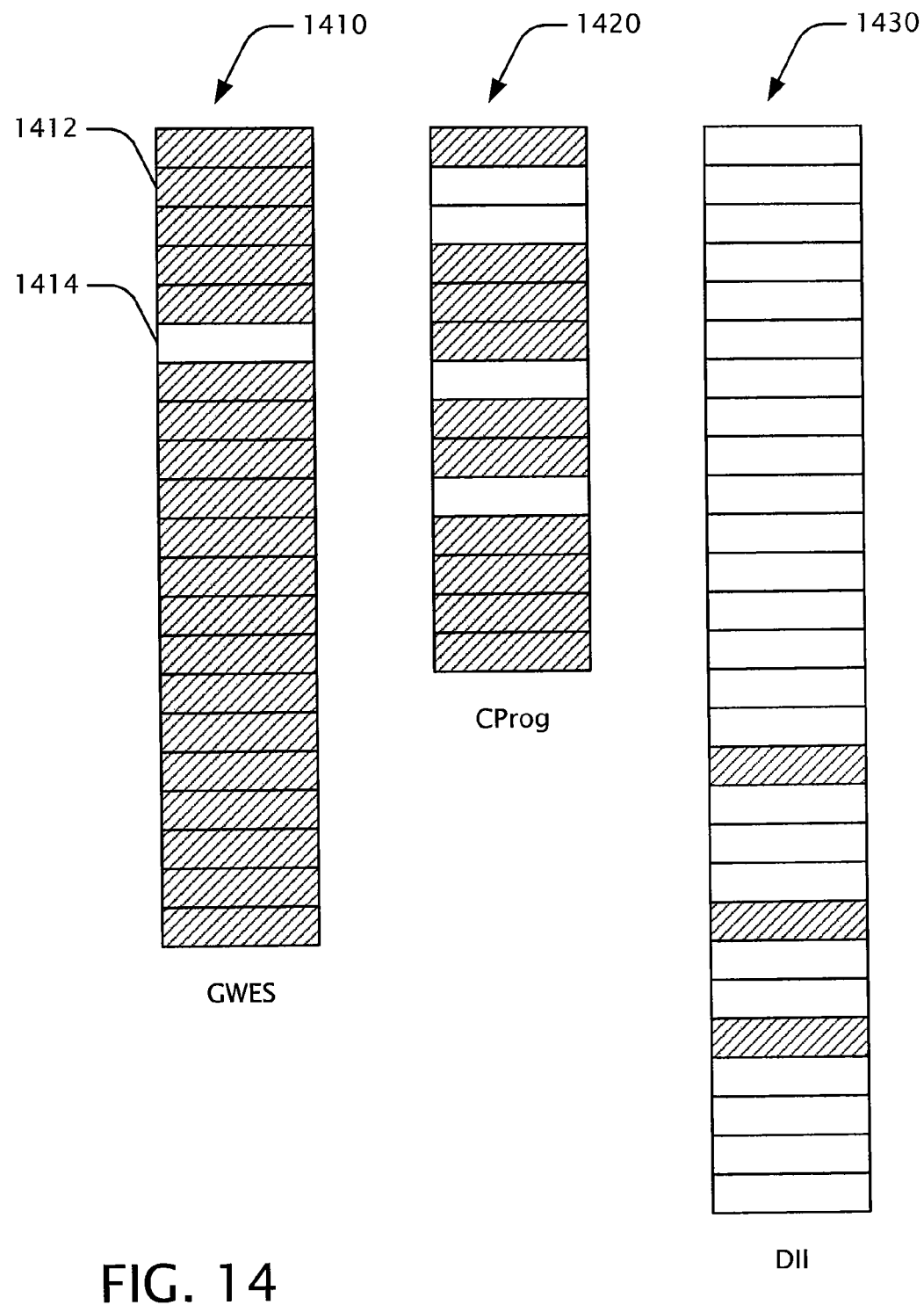
FIG. 14 shows an exemplary embodiment of a map for software after testing has been performed.

FIG. 14 shows an exemplary embodiment of a map (similar to the map of FIG. 13) after testing has been performed. In FIG. 14, the binaries GWES, CProg and DII are represented by segments 1410, 1420, 1430, respectively. In this depiction, a dirty memory segment is shown with a crosshatch fill (e.g., segment 1412), while a non-dirty segment (not loaded during testing) is shown unfilled (e.g., segment 1414). In the example of FIG. 14, 20 out of 21 segments of the GWES binary were loaded by the page pool, 10 of 14 segments of the CProg binary were loaded, and 3 of 28 of the DII segments were loaded. In some cases, results like those of FIG. 14 could indicate that poor test performance of software in a device is related to the DII binary, since much of this binary was not stressed.

Figure 15:
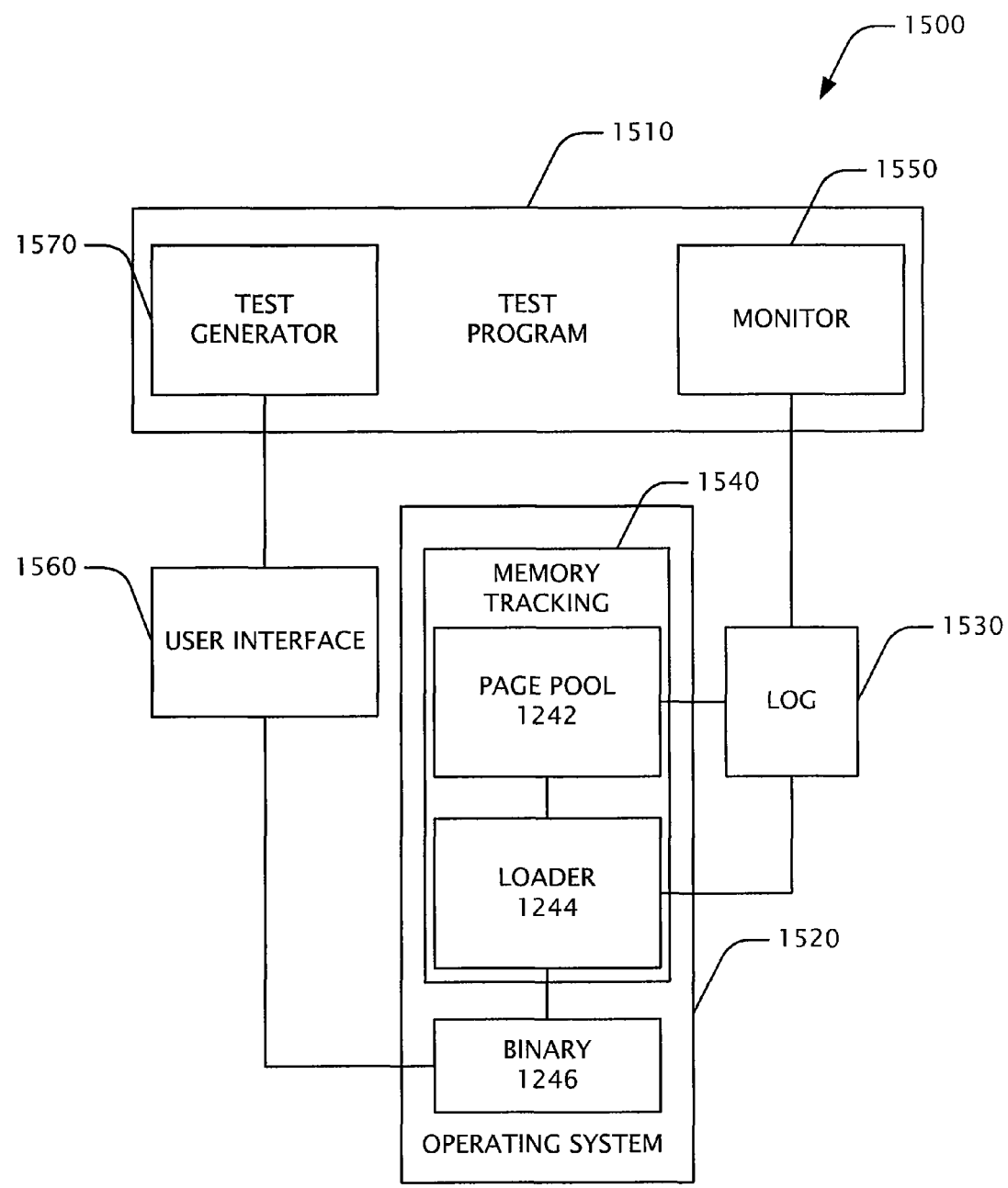
FIG. 15 shows a block diagram of an exemplary embodiment of a system for use in testing software.

FIG. 15 shows a block diagram of an exemplary embodiment of a system 1500, which can be used to implement methods like the method 1200. The system 1500 comprises a test program 1510 which exercises one or more portions of an operating system 1520 (e.g., a binary 1546). The binary 1546 receives input from a test generator 1570 (which can provide random or deterministic tests) through, for example, a user interface component 1560.

A log 1530 receives data from a memory tracking component 1540. In the depicted embodiment, the memory tracking component 1540 comprises a page pool 1542 and a loader 1544. The page pool 1542 and the loader 1544 provide data to the log 1530 (e.g., as described above for FIG. 12). The log 1530 provides log data to a monitor 1550, which processes the log data to determine execution coverage of the binary 1546 during testing.

In view of the many possible embodiments to which the principles of the disclosed technologies may be applied, it should be recognized that the illustrated embodiments are only examples of the technologies and should not be taken as limiting the scope of the invention. Rather, the scope of the invention is defined by the following claims. We therefore claim as our invention all that comes within the scope of these claims.

We claim:

1. A computer-implemented method comprising:
   placing software operating on a portable electronic device in a random state by providing random input to the device using a random test tool; and
   performing one or more deterministic tests on the software on the device from the random state using a deterministic test tool, different from the random test tool;
   monitoring, using at least one probe, whether a crash or hang occurred during the performed one or more deterministic tests.

2. The computer-implemented method of claim 1, further comprising creating a metric by measuring a portion of the software operating on the device that is tested by the providing the random input or by the one or more deterministic tests.

3. The computer-implemented method of claim 2, the method further comprising weighting one or more test results according to the metric.

4. The computer-implemented method of claim 1, at least a portion of the software operating on the device comprising a non-instrumented build.

5. The computer-implemented method of claim 1, further comprising operating one or more monitors of the software while performing at least one of the one or more deterministic tests.

6. The computer-implemented method of claim 1, the random state being a first random state, the method further comprising placing the software operation on the portable electronic device in a second random state after performing the one or more deterministic tests.

7. The computer-implemented method of claim 1, the software comprising a first software portion, the method further comprising determining whether the first software portion affects one or more functions of a second software portion.

8. The computer-implemented method of claim 1, the method further comprising storing one or more test results on another electronic device.

9. The computer-implemented method of claim 1, the method further comprising interacting with one or more other portable electronic devices as part of the performing the one or more deterministic tests.

10. One or more computer-readable media having encoded thereon instructions which, when executed, cause a processor to perform the method of claim 1.

11. A system comprising:
- a computer-implemented random test tool configured to place software operating on a portable electronic device in a random state;
- a computer-implemented deterministic test tool, different than the random test tool, configured to perform one or more deterministic tests on the software from the random state;
- a computer-implemented monitor comprising two or more probes, including a battery probe to measure power drawn on the portable electronic device for the performed one or more deterministic tests, and a crash probe to detect any crash that occurred during the performed one or more deterministic tests; and
- a computer-implemented scoring component configured to weight test results based at least in part on how much of the software was tested.

12. The system of claim 11, further comprising a computer-implemented monitoring component.

13. The system of claim 11, wherein at least one of the random test tool and the deterministic test tool are implemented on the portable electronic device.

14. One or more computer-readable media having encoded thereon instructions which, when executed by a processor, cause the processor to perform a method, the method comprising:
- identifying, out of a plurality of software portions in a portable electronic device, one or more software portions that have been loaded, during execution of a test program on the portable electronic device, from a first memory in the portable electronic device into a second memory in the portable electronic device for execution of the identified software portions by the device;
- generating a list of code binaries associated with the software portions of the portable electronic device, and a size entry associated with a physical size of the corresponding code binaries.

15. The one or more computer-readable media of claim 14, the method further comprising generating a description of the identified one or more software portions.

16. The one or more computer-readable media of claim 14, the identifying comprising monitoring at least one of a page pool and a loader component.

17. The one or more computer-readable media of claim 14, the one or more software portions being divided into sections related to the size of a memory page.

18. The one or more computer-readable media of claim 14, the method further comprising generating a score for the portable electronic device relative to another portable electronic device.

19. The one or more computer-readable media of claim 14, the method further comprising determining an amount of the plurality of software portions tested by the test program based at least in part on the identified software portions.

20. The one or more computer-readable media of claim 14, wherein at least a portion of the plurality of software portions are non-instrumented.

* * * * *